UNITED STATES PATENT OFFICE.

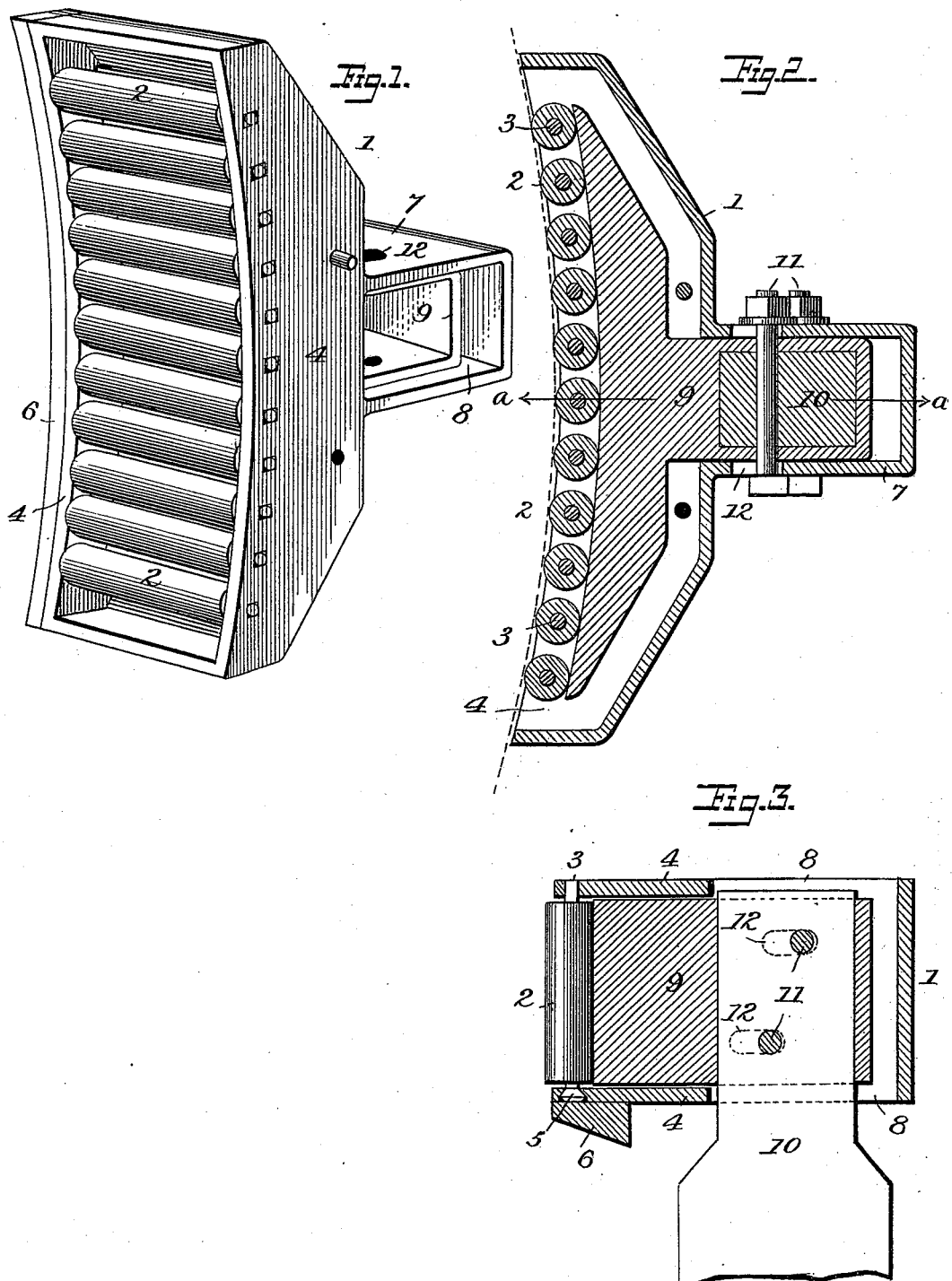

JOHN O'BRIEN, OF GRACEDALE, PENNSYLVANIA.

BRAKE-SHOE.

SPECIFICATION forming part of Letters Patent No. 528,553, dated November 6, 1894.

Application filed May 28, 1894. Serial No. 512,629. (No model.)

*To all whom it may concern:*

Be it known that I, JOHN O'BRIEN, a citizen of the United States, residing at Gracedale, in the county of Luzerne and State of Pennsylvania, have invented certain new and useful Improvements in Brake-Shoes, of which the following is a specification.

My invention relates to brake shoes for car wheels and for the wheels of other vehicles such as wagons.

The invention has for its object to produce a brake shoe which can be applied to wheels without danger of sliding or "flatting" them, and yet with sufficient force and effect to retard the vehicle and stop it, without producing this undesirable result.

A further object of the invention is to produce a brake shoe which is strong and durable and at the same time simple and inexpensive in construction.

For a detailed description, reference is made to the following specification and to the accompanying drawings, in which—

Figure 1 is a perspective view showing my brake shoe as applied to car wheels. Fig. 2 is a longitudinal sectional view of the same. Fig. 3 is a section on the line a—a of Fig. 2.

Referring to the drawings 1 indicates a hollow casing of the general form of a brake shoe. The front of the casing, or the face presented to the wheel, is entirely open and the frictional surface consists of a series of rollers 2, mounted on pins 3, which pins are supported in perforations in the sides 4 of the casing. The pins 3 are preferably made square and provided with heads at their inner ends 5, so that they may not turn. An angular strip 6 is attached to the casing at the inner side to bear against the flange of the wheel and for the additional purpose of preventing the pins 5 from coming out. The strip 6 is detachably connected to the casing by means of bolts or other suitable fastenings.

At the back the casing is extended into a rectangular box-like projection 7 somewhat larger than the ends of the brake beam and open at the sides 8, to permit the beam to pass in. Within the casing is the brake shoe proper 8 having its face adapted to bear upon the rollers 2. A hollow shank 9 of the brake shoe extends into the projection 7 of the casing and into this shank the brake beam 10 is passed and securely fastened by bolts 11. As shown the bolts pass through slots 12 in the outer casing. The brake shoe proper is fitted loosely in the casing so that when the brake is not in use it has little or no bearing upon the roller. When, however, the shoe is pressed toward the wheel by the brake beam, the rollers are engaged upon one side by the shoe and upon the opposite side by the wheel. Under these circumstances, there is little strain brought upon the journal pins 3 as the casing in which they are mounted is loose upon the shoe.

The rollers and the brake shoe proper are preferably made of cast steel, while the outer casing may be made of cast iron. Other materials, however, may be used if desired. My improved brake will produce a powerful retarding effect upon the wheels but it will not stop their motion, and thus produce the effect known as "flatting." Moreover, it is well known that a sliding wheel does not stop a car or train as quickly as a wheel which is revolving under considerable brake pressure, and for this reason my improved brakes will be found more effective than those commonly used.

The wearing parts of my brake shoe are chiefly the rollers and the shoe proper 8. By removing the strip 6, the journal pins of the rollers may be taken out and the rollers removed, and by removing the bolts 11, the shoe may be withdrawn from the brake beam and then removed from the casing. It will thus be evident that the wearing parts of the brake shoe may be readily replaced whenever it is necessary to renew them on account of wear.

It will be evident that minor changes in the mechanical construction of my improved brake shoe may be made without departing from the spirit of the invention.

Without, therefore limiting myself to the precise construction and arrangement of parts shown and described, I claim—

1. In a brake shoe the combination with the casing having side walls and a box-like rearward projection, of a series of rollers supported in the side walls and adapted to bear upon a wheel, a brake shoe loosely arranged within the casing having a face adapted to bear upon the rollers and a shank extending into the projection of the casing and adapted to receive the end of the brake beam, substantially as described.

2. In a brake shoe the combination with the casing having side walls 4, of headed journal pins passing through said walls, rollers upon the pins, a strip 6 attached to the inner wall of the casing and arranged to bear upon the flange of the wheel and to hold the pins in the casing and a brake shoe proper arranged to bear upon the rollers, substantially as described.

In testimony whereof I affix my signature in presence of two witnesses.

JOHN O'BRIEN.

Witnesses:
 JOHN SCHWAB,
 P. L. HOOVER.